US010925321B2

(12) United States Patent
Ouyang

(10) Patent No.: US 10,925,321 B2
(45) Date of Patent: Feb. 23, 2021

(54) HEATING DEVICE AND ELECTRONIC CIGARETTE HAVING SAME

(71) Applicant: SHENZHEN IVPS TECHNOLOGY CO., LTD., Shenzhen (CN)

(72) Inventor: Junwei Ouyang, Shenzhen (CN)

(73) Assignee: SHENZHEN IVPS TECHNOLOGY CO., LTD., Guangdong (CN)

( * ) Notice: Subject to any disclaimer, the term of this patent is extended or adjusted under 35 U.S.C. 154(b) by 184 days.

(21) Appl. No.: 16/150,316

(22) Filed: Oct. 3, 2018

(65) Prior Publication Data

US 2020/0008467 A1   Jan. 9, 2020

(51) Int. Cl.

| A24F 47/00 | (2020.01) |
| H05B 1/00 | (2006.01) |
| H02J 7/00 | (2006.01) |
| A24F 40/40 | (2020.01) |
| A24F 40/50 | (2020.01) |

(52) U.S. Cl.
CPC ............ *A24F 47/008* (2013.01); *A24F 40/40* (2020.01); *A24F 40/50* (2020.01); *H02J 7/00* (2013.01); *H05B 1/00* (2013.01)

(58) Field of Classification Search
CPC ........ A24F 47/008; A24F 40/50; A24F 40/40; H05B 1/0244
USPC ......................................................... 131/333
See application file for complete search history.

(56) References Cited

U.S. PATENT DOCUMENTS

2018/0177233 A1   6/2018   Tucker et al.

FOREIGN PATENT DOCUMENTS

| CN | 206923676 U | * | 1/2018 |
| CN | 206923676 U |   | 1/2018 |
| CN | 207285196 U |   | 5/2018 |
| CN | 207561380 U | * | 7/2018 |
| CN | 207561380 U |   | 7/2018 |
| WO | 2017075759 A1 |   | 5/2017 |

* cited by examiner

*Primary Examiner* — Eric Yaary
*Assistant Examiner* — Jennifer A Kessie
(74) *Attorney, Agent, or Firm* — IP-PAL Patent US; Klaus Michael Schmid

(57) ABSTRACT

The invention discloses a heating device and an electronic cigarette applying the heating device. The electronic cigarette comprises a battery component, the battery component is provided with a installing chamber having an opening, the heating device comprises a heating base and a hollow sleeve, the sleeve is detachably mounted on the heating base and encircles receiving space for receiving the tobacco product together with the heating base, when the heating device is mounted in the installing chamber, the heating base is electrically connected to the battery component, and the battery component drives the heating base to heat the tobacco product received in the receiving space. The technical solution of the invention is effective for facilitating the user to clean the heating device.

8 Claims, 6 Drawing Sheets

HEATING DEVICE AND ELECTRONIC CIGARETTE HAVING SAME

TECHNICAL FIELD

The invention relates to a heating device and an electronic cigarette applying the heating device.

BACKGROUND

Studies have shown the use of "heating non-burning". Related studies have shown that nicotine and some tobacco flavor components can be transferred to smoke in a manner of only heating but not burning tobacco at a lower temperature below 500° C. Compared to traditional burning cigarettes, low temperature cigarettes can significantly reduce the release of tar and harmful components as a whole. At the same time, there is basically no side aerosol, which is of little harm to others and the environment.

The existing low-temperature flue-cured tobacco is usually provided with a heating chamber for the user to add tobacco products, and then is provided with a heating device to heat the tobacco product in the heating chamber. However, the substance generated by the tobacco product during heating tends to adhere to the surface of the heating chamber and the heating device, and the heating chamber cannot be removed from the electronic cigarette. During cleaning, the cleaning device needs to be placed into the heating chamber to clean the chamber wall of the heating chamber and the surface of the heating device, resulting in deficiencies that it is more difficult to clean and it is low in degree of cleanliness.

SUMMARY

The main object of the invention is to provide a heating device, which is intended to facilitate the user to clean the heating device.

In order to achieve the above object, the invention provides a heating device applied to an electronic cigarette, wherein the electronic cigarette comprises a battery component, the battery component is provided with a installing chamber having an opening, wherein the heating device comprises a heating base and a hollow sleeve, the sleeve is detachably mounted on the heating base, and encircles a receiving space for receiving the tobacco product together with the heating base, when the heating device is mounted in the installing chamber, the heating base is electrically connected to the battery component, and the battery component drives the heating base to heat the tobacco product received in the receiving space.

Preferably, one of the heating base and the sleeve is provided with a installing groove, and the other thereof is provided with an installing part, and when the sleeve is mounted on the heating base, the installing part is received in the installing groove so that the sleeve is fixed to the heating base.

Preferably, the inner groove wall of the installing groove is provided with an internal thread, and the outer wall of the installing part is correspondingly provided with a connecting thread, so that the sleeve is detachably connected to the heating base; or, one of the inner groove wall of the installing groove and the outer surface of the installing part is convexly provided with a protrusion, and the other thereof is correspondingly provided with an engaging slot, so that the sleeve is detachably connected to the heating base; or, both the inner groove wall of the installing groove and the outer surface of the installing part are each correspondingly provided with a through hole, the heating base further comprises a connecting pin, and the connecting pin is inserted into the two through holes, so that the sleeve is detachably connected to the heating base; or, one of the installing groove and the installing part is provided with an elastic clamping part, and when the installing part is mounted in the installing groove, the elastic clamping part clamps the installing part in the installing groove, so that the sleeve is detachably connected to the heating base.

Preferably, the heating base is further provided with a first connecting part, the battery component is provided with a second connecting part inside the installing chamber, the first connecting part cooperates with the second connecting part, so that the heating base is detachably mounted in the installing chamber, one end of the sleeve far away from the heating base is further provided with a gripping part, and the gripping part protrudes from the installing chamber to the outside.

Preferably, the heating base comprises a base body and a heat generating component, the base body is provided with an internal cavity and a installing groove, the internal cavity is communicated with the installing groove, one end of the heat generating component is received in the internal cavity, and the other end thereof is exposed to the outside of the installing groove through the internal cavity and the installing groove, and when the sleeve is mounted in the installing groove, a part of the heat generating component exposed to the outside of the installing groove is received in the receiving space.

Preferably, the base body comprises a carrying member and a cover member, the carrying member is provided with the installing groove, one end of the sleeve is provided with a installing part, and when the installing part is mounted in the installing groove, the cover member is pressed closely in the installing groove, so that the cover member covers a part of the groove wall of the installing groove, and the cover member and the groove wall encircle the internal cavity.

Preferably, the heat generating component comprises a circuit board and a heat generating unit, the circuit board is mounted in the internal cavity, one end of the heat generating unit is mounted in the internal cavity and is electrically connected to the circuit board, and the other end thereof is received in the receiving space through the cover member, and when the heating device is mounted in the installing chamber, the circuit board is electrically connected to the battery component.

Preferably, one of the circuit board and the cover member is provided with a limiting part, and the other thereof is correspondingly provided with a limiting groove, and when the cover member is mounted in the installing groove, one of the limiting parts is inserted into one of the limiting grooves, so that the circuit board is limited to the cover member; and/or one of the heat generating unit and the cover member is provided with a positioning part, and the other thereof is correspondingly provided with a positioning groove, and when the cover member is mounted in the installing groove, the positioning part is received in the positioning groove, so that the heat generating unit is limited to the cover member.

Preferably, the heating base is further provided with a conductive terminal electrically connected to the circuit board and an opening exposed to the conductive terminal, the conductive terminal comprises a positive electrode contact and a negative electrode contact, and when the heating device is mounted in the installing chamber, the positive electrode contact is electrically connected to an output positive electrode of the battery component, and the negative electrode contact is electrically connected to an output negative electrode of the battery component.

The invention further provides an electronic cigarette, wherein the electronic cigarette comprises a battery component and a heating device. The electronic cigarette comprises a battery component, the battery component is provided with a installing chamber having an opening, wherein the heating device comprises a heating base and a hollow sleeve, the sleeve is detachably mounted on the heating base, and encircles a receiving space for receiving the tobacco product together with the heating base, when the heating device is mounted in the installing chamber, the heating base is electrically connected to the battery component, and the battery component drives the heating base to heat the tobacco product received in the receiving space.

The heating device of the technical solution of the invention combines a hollow sleeve and a heating base to encircle a receiving space for receiving the tobacco product, and heats the heating base so that the internal temperature of the receiving space is raised to form a heating chamber for heating the pre-mounted tobacco product. The heating device and the battery component are relatively independent, which is easy to clean. Further, the sleeve is detachably mounted on the heating base. The sleeve is detached from the heating base during cleaning. When being cleaned, the sleeve can be cleaned using cleaning liquid, effectively improving the cleaning effect and effectively preventing the cleaning liquid from penetrating into the electronic cigarette and into the heating base so as to cause damage to electronic components. At the same time, after the sleeve is detached, the surface of the heating base is exposed, which is convenient for the user to clean, preventing the phenomenon that the degree of cleanliness is low and it is easy to damage the heating device when a similar conventional electronic cigarette cleans the heating device in a small heating chamber.

BRIEF DESCRIPTION OF THE DRAWINGS

For a better illustration of the embodiments of the invention or the technical solution in the prior art, accompanying drawings needed in the description of the embodiments or the prior art are simply illustrated below. Obviously, the accompanying drawings described below are some embodiments of the invention. For those skilled in the art, other accompanying drawings may be obtained according to the structure shown in these accompanying drawings without creative work.

DESCRIPTION OF THE REFERENCE NUMBERS

Figure 1:
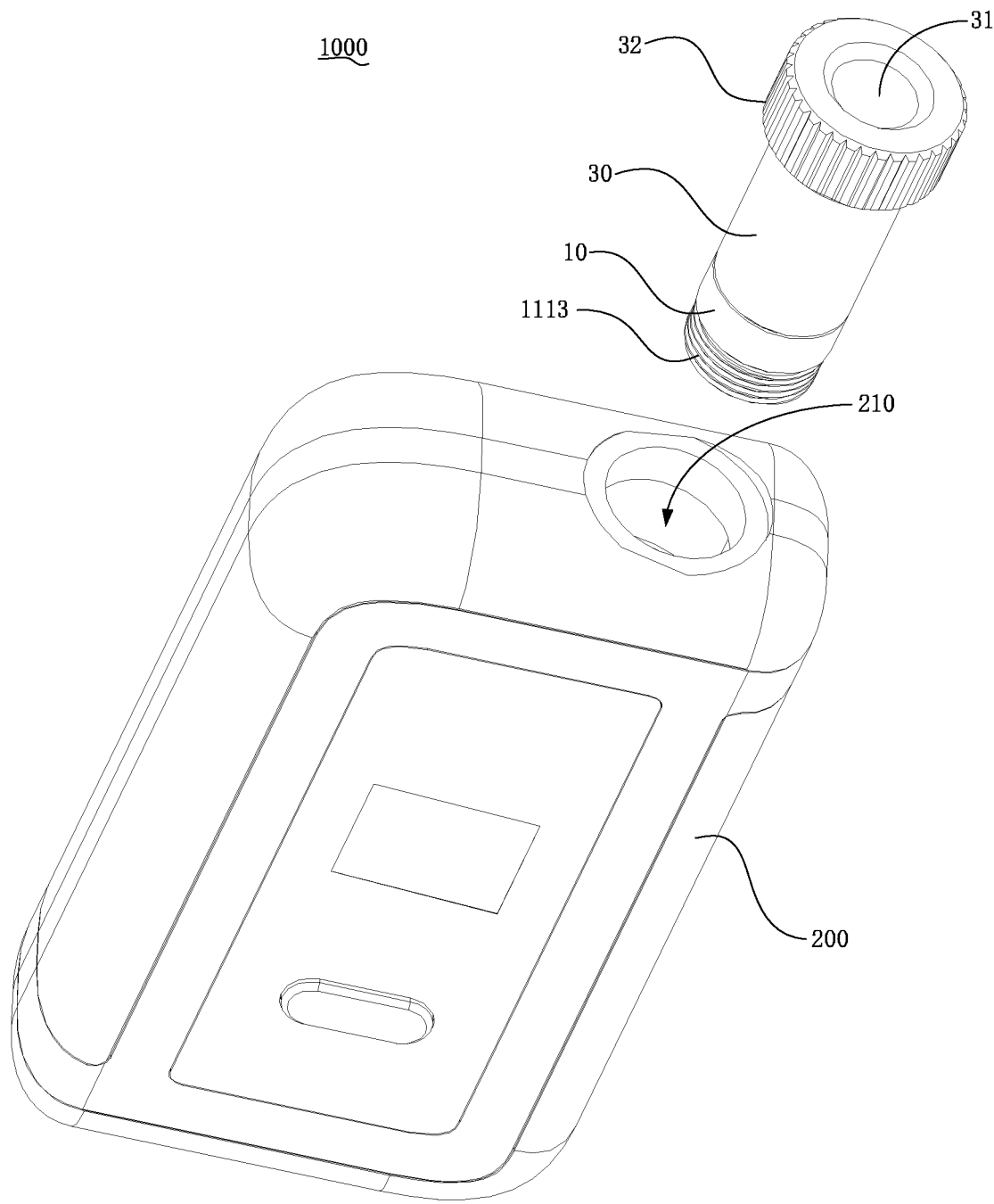
FIG. 1 is an exploded schematic diagram illustrating a connecting structure of an electronic cigarette according to the invention.

| Reference number | Name of part |
|---|---|
| 1000 | electronic cigarette |
| 100 | heating device |
| 10 | heating base |
| 11 | base body |
| 111 | carrying member |
| 1111 | installing groove |
| 1112 | opening |
| 1113 | first connecting part |
| 112 | cover member |
| 1121 | internal cavity |
| 1122 | limiting part |
| 1123 | positioning groove |
| 12 | heat generating component |
| 121 | circuit board |
| 1211 | insertion groove |
| 1212 | limiting groove |
| 1213 | conductive member |
| 1214 | conductive pad |
| 122 | heat generating unit |
| 1221 | positioning part |
| 1222 | conductive plug |
| 123 | conductive terminal |
| 1231 | positive electrode contact |
| 1232 | negative electrode contact |
| 1233 | substrate |
| 30 | sleeve |
| 31 | receiving space |
| 32 | gripping part |
| 33 | installing part |
| 200 | battery component |
| 210 | installing chamber |

The implementation of aims, the function features and the advantages of the present disclosure are described below in further detail in conjunction with embodiments with reference to the drawings.

DESCRIPTION OF THE EMBODIMENTS

A clear and complete description as below is provided for the technical solution in the embodiments of the invention in conjunction with the drawings in the embodiments of the invention. Obviously, the embodiments described hereafter are simply part embodiments of the invention, rather than all the embodiments. All other embodiments obtained by those skilled in the art based on the embodiments in the invention without creative work are intended to be included in the scope of protection of the invention.

It should be noted that all directional indications (such as top, bottom, left, right, front, behind . . . ) in the embodiments of the invention are merely to illustrate a relative position relation, a relative motion condition, etc. between each part in a certain state (for example, the state shown in the drawings). If the state changes, the directional indication changes accordingly.

In addition, if terms "first", "second", etc. appear in the invention, they are merely for the purpose of description, but cannot be understood as the indication or implication of relative importance or as the implicit indication of the number of the designated technical features; therefore, features defined by "first" and "second" may specifically or implicitly comprise at least one such feature. In addition, technical solutions of each embodiment of the invention may be combined mutually; however, this must be carried out on the basis that those skilled in the art can implement the combination. When the combination of technical solutions has a conflict or cannot be implemented, it should be considered that such combination of technical solutions does not exist and is not in the scope of protection claimed by the invention.

In the invention, unless otherwise specifically stated and defined, terms "connected", "fixed", etc. should be interpreted expansively. For example, "fixed" may be fixed connection, detachable connection, or integration; may be mechanical connection or electrical connection; direct connection, indirect connection through an intermediate, or internal communication between two elements or interaction of two elements, unless otherwise specifically defined. Those skilled in the art can understand the specific implication of the above terms in the invention according to specific conditions.

The invention provides a heating device 100 applied to an electronic cigarette 1000, wherein the electronic cigarette 1000 comprises a battery component 200, and the battery component 200 is provided with an installing chamber 210 having an opening 1112.

Referring to FIG. 1 to FIG. 6, the heating device 100 is detachably mounted in the installing chamber 210. The heating device 100 comprises a heating base 10 and a hollow sleeve 30, the sleeve 30 is detachably mounted on the heating base 10, and encircles a receiving space 31 for receiving the tobacco product together with the heating base 10, when the heating device 100 is mounted in the installing chamber 210, the heating base 10 is electrically connected to the battery component 200, and the battery component 200 drives the heating base 10 to heat the tobacco product received in the receiving space 31. Here, in the present embodiment, the tobacco product is a block or filament tobacco or a tobacco pellet product processed from tobacco. The battery component 200 supplies current to the heating base 10 so that the heating base 10 bakes the tobacco product received in the receiving space 31 to generate smoke for the user to smoke.

The heating device 100 of the technical solution of the invention combines a hollow sleeve 30 and a heating base 10 to encircle a receiving space 31 for receiving the tobacco product, and heats the heating base so that the internal temperature of the receiving space 31 is raised to form a heating chamber for heating the pre-mounted tobacco product. The heating device 100 and the battery component 200 are relatively independent. The heating base 10 is detachably mounted in the installing chamber 210, so that the heating cavity is cleaned after being detachable from the battery component 200. Further, the sleeve 30 is detachably mounted on the heating base 10. The sleeve 30 is detached from the heating base 10 during cleaning. When being cleaned, the sleeve 30 can be cleaned using cleaning liquid, effectively improving the cleaning effect and effectively preventing the cleaning liquid from penetrating into the electronic cigarette 1000 and into the heating base 10 so as to cause damage to electronic components. At the same time, after the sleeve 30 is detached, the surface of the heating base 10 is exposed, which is convenient for the user to clean, preventing the phenomenon that the degree of cleanliness is low and it is easy to damage the heating device 100 when a similar conventional electronic cigarette 1000 cleans the heating device 100 in a small heating chamber.

It is to be understood that, in practical applications, the receiving space 31 is not limited to being encircled by the sleeve 30 and the heating base 10 as described above. For example, in another embodiment of the invention, the manner in which one end of the sleeve 30 is closed and an air inlet hole is provided to form the receiving space 31 for receiving the tobacco product also falls within the scope of protection of the invention.

Figure 2:
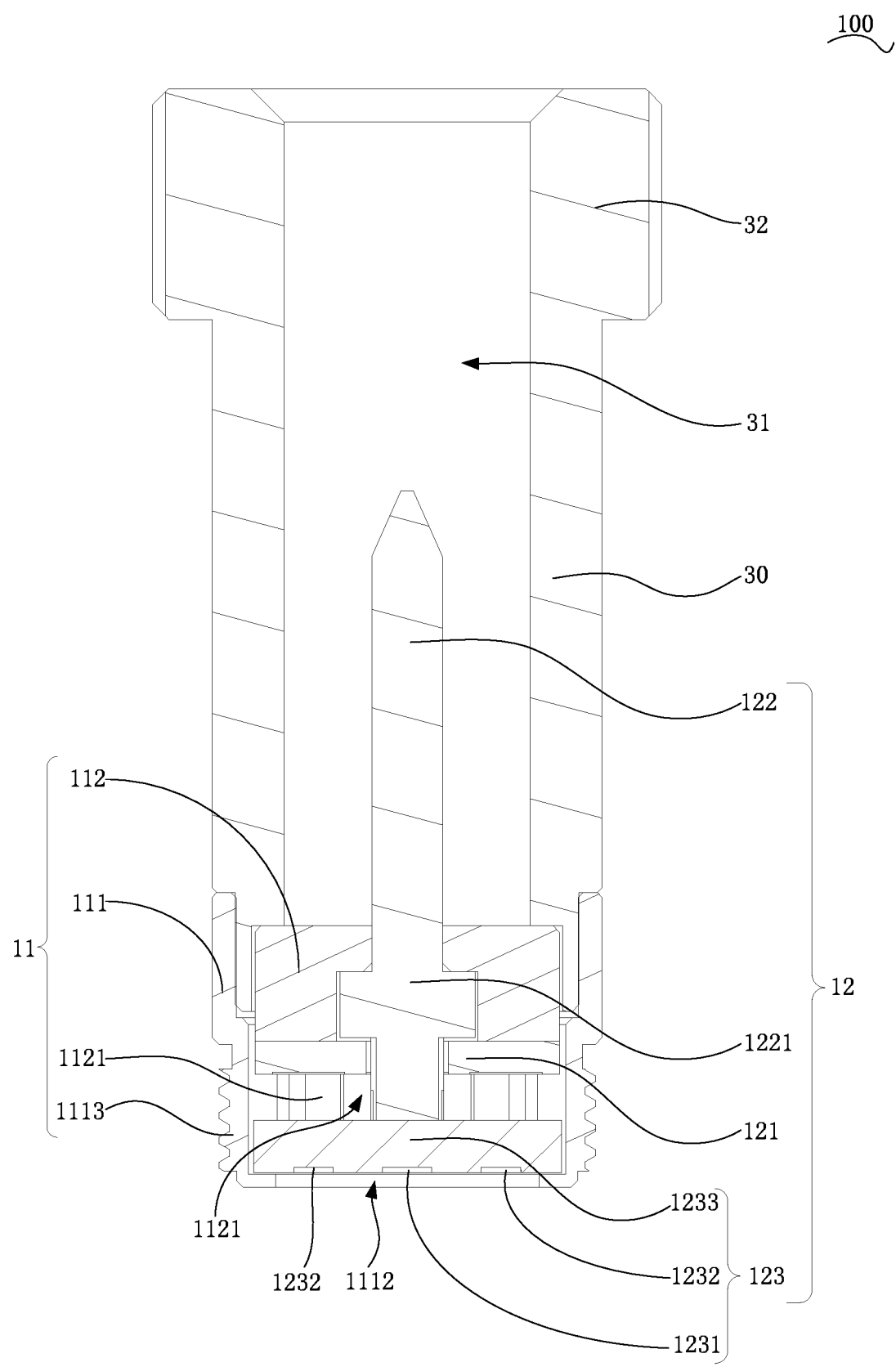
FIG. 2 is a cross-sectional schematic diagram illustrating a connecting structure of a heating device according to the invention.
Figure 3:
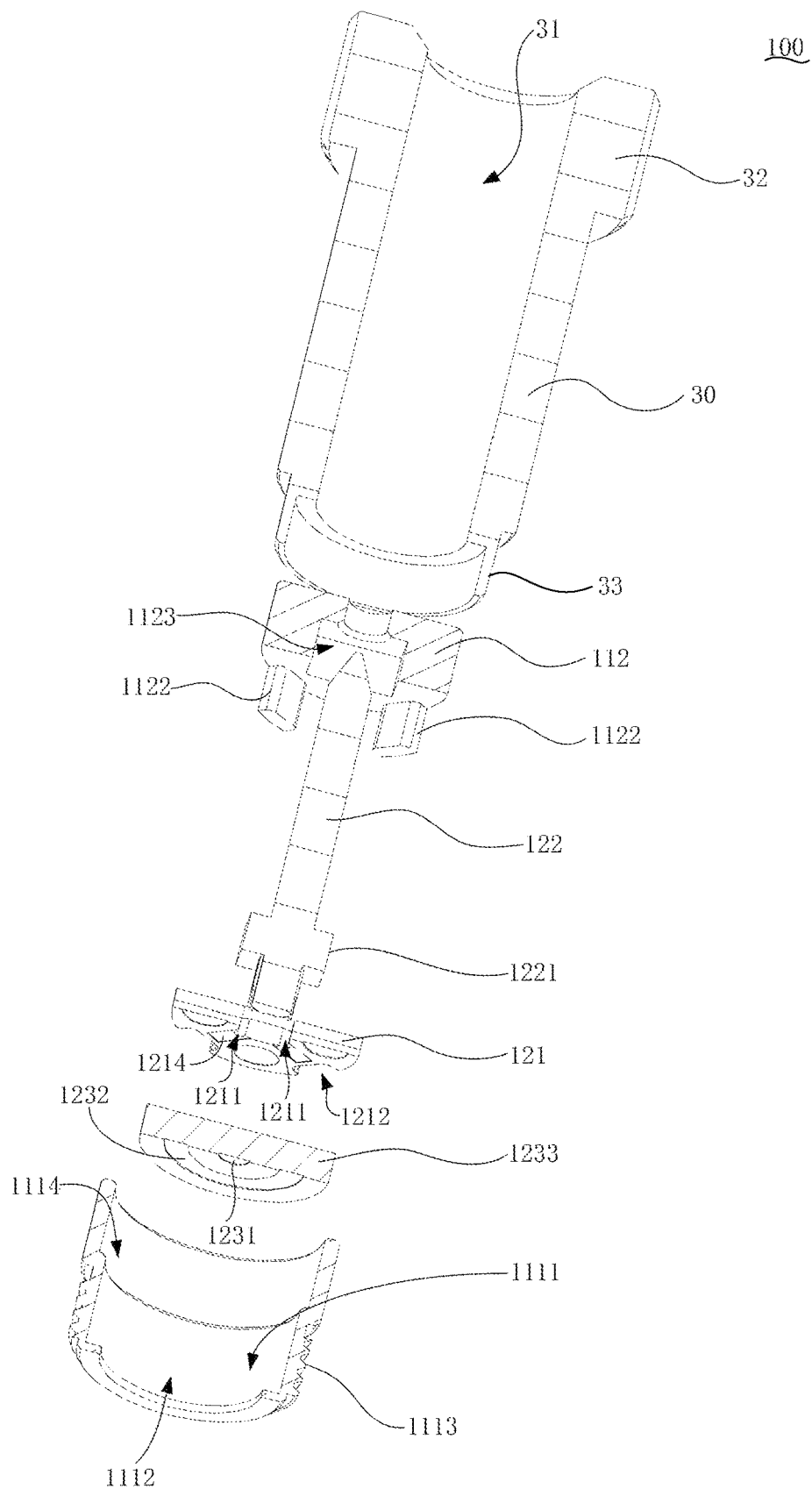
FIG. 3 is a cross-sectional exploded schematic diagram illustrating a connecting structure of a heating device according to the invention.

Specifically, as shown in FIG. 2 or FIG. 3, in the embodiment of the invention, the heating base 10 comprises a base body 11 and a heat generating component 12. One end of the sleeve 30 is detachably mounted on the base body 11 and encircles the receiving space 31 together with the base body 11. One end of the heat generating component 12 is mounted on the base body, and the other end thereof is received in the receiving space 31. Here, in the present embodiment, the heat generating component 12 is partially received in the receiving space 31, so that the heat generating component 12 can directly heat and bake the tobacco product in the receiving space 31, and the heating efficiency is high, thereby reducing the power loss of the battery component 200 and effectively enhancing the battery life of the battery component 200.

Specifically, one of the base body 11 and the sleeve 30 is provided with a installing groove 1111, and the other thereof is provided with an installing part 33, and when the sleeve 30 is mounted on the base body 11, the installing part 33 is received in the installing groove 1111 so that the sleeve 30 is fixed to the base body 11. Here, in the present embodiment, the base body 11 is provided with an installing groove 1111, and one end of the sleeve 30 is convexly provided with a installing part 33. When being mounted, the installing part 33 is received in the installing groove 1111 for fixing so that the transition surface of both the base body 11 and the sleeve 30 is smooth. At the same time, when being detached, the installing part 33 provided by the sleeve 30 is received in the installing groove 1111, so that the tobacco product residue inside the sleeve 30 falls in the installing groove 1111, avoiding the phenomenon that it is difficult to clean due to the fact that the residue falls in the installing chamber.

Further, the inner groove wall of the installing groove 1111 is provided with an internal thread (not shown), and the outer wall of the installing part 33 is correspondingly provided with a connecting thread (not shown) so that the sleeve 30 is detachably connected to the base body 11. Here, in the present embodiment, the connecting manner in which an internal thread is provided in the installing groove 1111 and the installing part 33 is correspondingly provided with a connecting thread is used, and the sleeve 30 and the base body 11 are threadedly engaged. It is convenient to mount and detach and it is not easy to shake there-between; at the same time, both the sleeve 30 and the base body 11 are threadedly engaged. When the electronic cigarette operates, the sleeve 30 is thermally expanded, so that the connection between the sleeve 30 and the base body 11 is more stable, effectively preventing the potential safety hazard that the sleeve 30 and the base body 11 are connected by means of snap-in, etc., the sleeve 30 is thermally expanded so that the snap-fit position is disengaged, and the sleeve 30 is detached from the installing chamber.

It is to be understood that, in practical applications, the sleeve 30 and the base body 11 are not limited to using the threaded connecting manner as described above. For example, in another embodiment of the invention, the manner in which one of the inner groove wall of the installing groove 1111 and the outer surface of the installing part 33 is convexly provided with a protrusion, and the other thereof is correspondingly provided with an engaging slot, so that the sleeve 30 is detachably connected to the base body 11; or, both the inner groove wall of the installing groove 1111 and the outer surface of the installing part 30 are each provided with a through hole correspondingly, the heating base further comprises a connecting pin, and the connecting pin is inserted into the two through holes, so that the sleeve 30 is detachably connected to the base body 11, falls within the scope of protection of the invention. In addition, in another embodiment of the invention, one of the installing groove 1111 and the installing part 33 is provided with an elastic clamping part, and when the installing part 33 is mounted in the installing groove 1111, the elastic clamping part clamps the installing part 33 in the installing groove 1111, so that the sleeve 30 is detachably connected to the heating base 10. Here, in this embodiment, the inner wall of the installing groove 1111 in the circumferential direction is provided with an elastic plastic ring to form an elastic clamping part. When the installing part 33 is mounted in the installing groove 1111, the installing part 33 is inserted into the plastic ring, and the plastic ring is squeezed. The manner in which the plastic ring received between the installing groove 1111 and the installing part 33 clamps the installing part 33 in the installing groove 1111 under the elastic restoring force also falls within the scope of protection of the invention.

Specifically, as shown in FIG. 2 or FIG. 3, in the embodiment of the invention, the base body 11 comprises a carrying member 111 and a cover member 112, the carrying member 111 is provided with the installing groove 1111, one end of the sleeve 30 is provided with a installing part 33, and when the installing part 33 is mounted in the installing groove 1111, the cover member 112 is pressed closely in the installing groove 1111, so that the cover member 112 covers a part of the groove wall of the installing groove 1111, and the cover member 112 and the groove wall encircle the internal cavity 1121. One end of the heat generating component 12 is mounted in the internal cavity 1121, and the other end thereof passes through the cover member 112 and is received in the receiving space 31.

Here, in the present embodiment, the heat generating component 12 is pre-mounted in the installing groove 1111 provided by the carrying member 111, and the cover member 111 is mounted in the installing groove 1111 and covers one end of the heat generating component 12, so that the heat generating component 12 is partially limited in the internal cavity 1121 formed between the cover member 111 and the installing groove 1111. The sleeve 30 is screwed to the installing groove 1111, and the cover member 112 is pressed in the installing groove 1111, so that the cover member 112 and the heat generating component 12 are fixed in the installing groove 1111 without bolts, effectively reducing the occupied space. At the same time, when the cover member 112 is mounted in the installing groove 1111, there is a gap between the cover member 112 and the inner groove wall of the installing groove 1111. When the installing part 33 is mounted in the installing groove 1111, the installing part 33 is inserted into the gap to press the cover member 112. At the same time, the cover member 112 has a reaction force against the installing part 33 so that the installing part 33 is close fit with the inner wall of the installing groove 1111 to further strengthen the connection strength between the installing part 33 and the carrying member 111.

Specifically, the cover member 112 is further provided with a through hole (not labeled) through which the heat generating component 12 partially passes. One end of the heat generating component 12 passes through the through hole. When being received in the receiving space 31, the outer surface of the heat generating component 12 is in contact with the hole wall of the through hole for limiting, effectively preventing the phenomenon that the heat generating component 12 is greatly shaken.

It is to be understood that, in practical applications, it is not limited to using the form in which the carrying member 111 is provided with the installing groove 1111 to form the installing part 33. For example, the manner in which an avoidance groove is provided on the inner wall of the end of the sleeve 30, the carrying member is correspondingly provided with a protruding installing part 33, the protruding installing part 33 is inserted into the sleeve 30, and a connecting thread is provided for connecting also falls within the scope of protection of the invention.

Further, as shown in FIG. 2 or FIG. 3, in the embodiment of the invention, the base body 11 is further provided with a first connecting part 1113, the battery component 200 is provided with a second connecting part inside the installing chamber 210, the first connecting part 1113 cooperates with the second connecting part (not shown), so that the base body 11 is detachably mounted in the installing chamber 210, one end of the sleeve 30 far away from the heating base 10 is further provided with a gripping part 32, and the gripping part 32 protrudes from the installing chamber 210 to the outside. Here, in the embodiment of the invention, a connecting manner such as a buckle, a pin, a thread, etc. may be used to form the first connecting part 1113 and the second connecting part, respectively. In the present embodiment, an inner thread is provided on the inner wall of the installing chamber 210 to form a second connecting part. A connecting thread is provided at an end of the carrying member 111 far away from the sleeve 30, so that the carrying member 111 is detachably fixed to the installing chamber 210. At the same time, the end of the sleeve 30 far away from the heating base 10 is provided with a gripping part 32. The surface of the gripping part 32 is provided with a texture for increasing damping, which effectively increases the frictional force when the user grips and further facilitates the user to detach.

It is to be understood that, in practical applications, if the sleeve 30 and the carrying member 111 of the base body 11 are connected by threads, when the carrying member 111 of the base body 11 and the installing chamber 210 are connected by screwing once again, it is easy to have the phenomenon that when the user screws down the sleeve 30 through the gripping part 32, the sleeve 30 is directly unscrewed from the heating base 10, so that the heating base 10 cannot be detached from the installing chamber 210 provided by the battery component 200. Therefore, in this embodiment, the outer wall of the sleeve 30 is provided with the connecting thread, rather than the fact that the base body 11 is provided with a connecting thread to form a first connecting part 1113. At this time, when the user grips the gripping part 32 to rotate, the first connecting part 1113 formed by the connecting thread provided on the outer wall of the sleeve 30 is disengaged from the second connecting part provided in the installing chamber 210, and the force is applied to the outer wall of the sleeve 30. The base body 11 of the heating base 10 is not subjected to external force. Therefore, the heating base 10 is detached from the worksite component together with the sleeve 30, effectively preventing the phenomenon that it is inconvenient for the heating base 10 to be detached from the installing chamber 210 as described above.

Preferably, as shown in FIG. 2 or FIG. 3, in the embodiment of the invention, the heat generating component 12 comprises a circuit board 121 and a heat generating unit 122, the circuit board 121 is mounted in the internal cavity 1121, one end of the heat generating unit 122 is mounted in the internal cavity 1121 and is electrically connected to the circuit board 121, and the other end thereof is received in the receiving space 31 through the cover member 122, and when the heating device 100 is mounted in the installing chamber 210, the circuit board 121 is electrically connected to the battery component 200. Here, in the present embodiment, the heat generating unit 122 is a ceramic heat generating rod. The heat generating rod gradually raises the temperature to heat the receiving space 31 under the power supply of the battery component 200, so that the temperature inside the receiving space 31 is raised to 300° C. to 450° C. The circuit board 121 is covered by the cover member 112 to effectively prevent the phenomenon that the tobacco dregs in the receiving space 31 or the condensed water formed on the outer wall of the sleeve 30 fall onto the circuit board 121, thereby causing damage to the circuit board 121. At the same time, the heat generating unit 122 is partially received in the receiving space 31 through the cover member 122, so that the tobacco product received in the receiving space 31 is directly heated. The heating efficiency is high, and the power output by the battery component 200 is effectively saved, thereby achieving a long battery life.

It is to be understood that, in practical applications the heat generating unit 122 is not limited to the manner in which the heat generating rod is partially received in the receiving space 31 through the installing part 33 as described above. For example, the heating manner in which a heat generating unit 122 formed of a thermal fuse may also be employed, and the sleeve 30 is heated by winding the thermal fuse around the outer wall of the sleeve 30 so that the temperature of the receiving space 31 inside the sleeve 30 rises also falls within the scope of protection of the invention.

Figure 4:
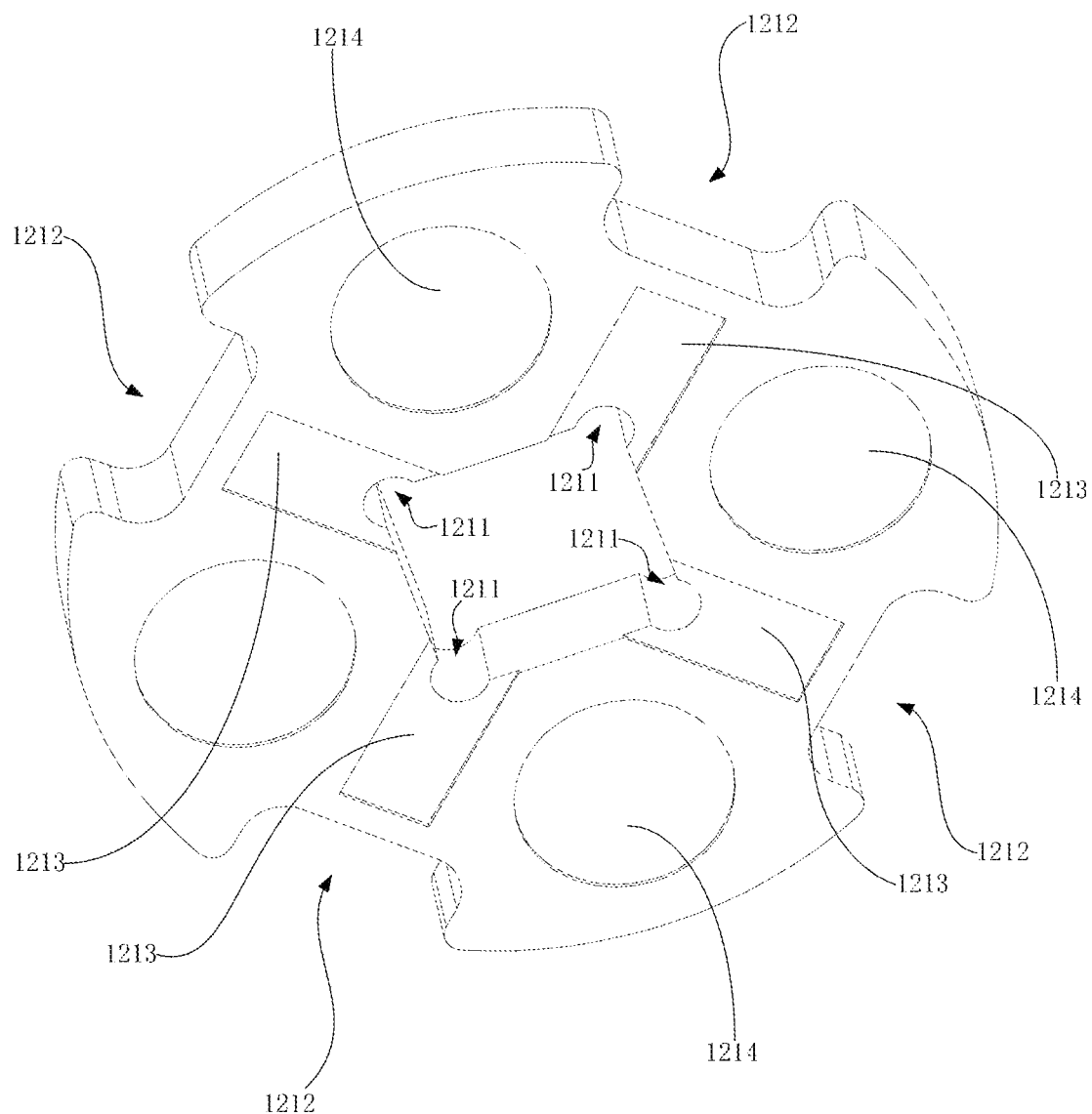
FIG. 4 is a perspective schematic diagram illustrating a connecting structure of a circuit board in a heating device according to the invention.

Further, as shown in FIG. 3 or FIG. 4, in the embodiment of the invention, the circuit board 121 comprises at least two insertion grooves 1211, the inner groove wall of the insertion grooves 1211 is provided with a conductive member 1213, the heat generating unit 122 is provided with at least two conductive plugs 1222, and each of the conductive plugs 1222 is inserted into one of the insertion grooves 1211 and is in contact with the conductive member 1213 so that the heat generating unit 122 is electrically connected to the circuit board 121. Here, in the present embodiment, the circuit board 121 is provided with four insertion grooves 1211, the heat generating unit 122 is correspondingly provided with four conductive plugs 1222, and the four conductive plugs 1222 are inserted into the four insertion grooves 1211 to abut against the conductive member 1213 to achieve electrical conduction, which is convenient for the user to mount. At the same time, only the conductive plug 1222 of the heat generating unit 122 needs to be pulled out from the insertion groove 1211 when being replaced, and the operation is convenient. When the heat generating unit 122 is damaged or more dirt is left on the surface of the heat generating unit 122 in the later period, the user can replace the heat generating unit with a spare heat generating unit 122 by himself, and the entire heating device 100 does not need to be replaced, effectively saving the use cost.

It is to be understood that, in practical applications, the conductive member 1213 can be applied to the inner groove wall of the insertion groove 1211 using a conductive coating. At the same time, the manner in which in order to ensure the conductive stability, a conductive pin may also be provided, the conductive pin is inserted into the insertion groove 1211, and the conductive plug 1222 is pressed against the insertion groove 1211 to abut against the conductive member 1213 to ensure electrical connection also falls within the scope of protection of the invention.

Further, one of the circuit board 121 and the cover member 112 is provided with a limiting part 1122, and the other thereof is correspondingly provided with a limiting groove 1212, and when the cover member 112 is mounted in the installing groove 1111, one of the limiting parts 1122 is inserted into one of the limiting grooves 1212, so that the circuit board 121 is limited to the cover member 112. Here, in the present embodiment, the periphery of the cover member 112 is convexly provided with four limiting parts 1122, and the circuit board 121 is correspondingly provided with four limiting grooves 1212 to prevent the phenomenon that the circuit board 121 shakes during use.

Figure 5:
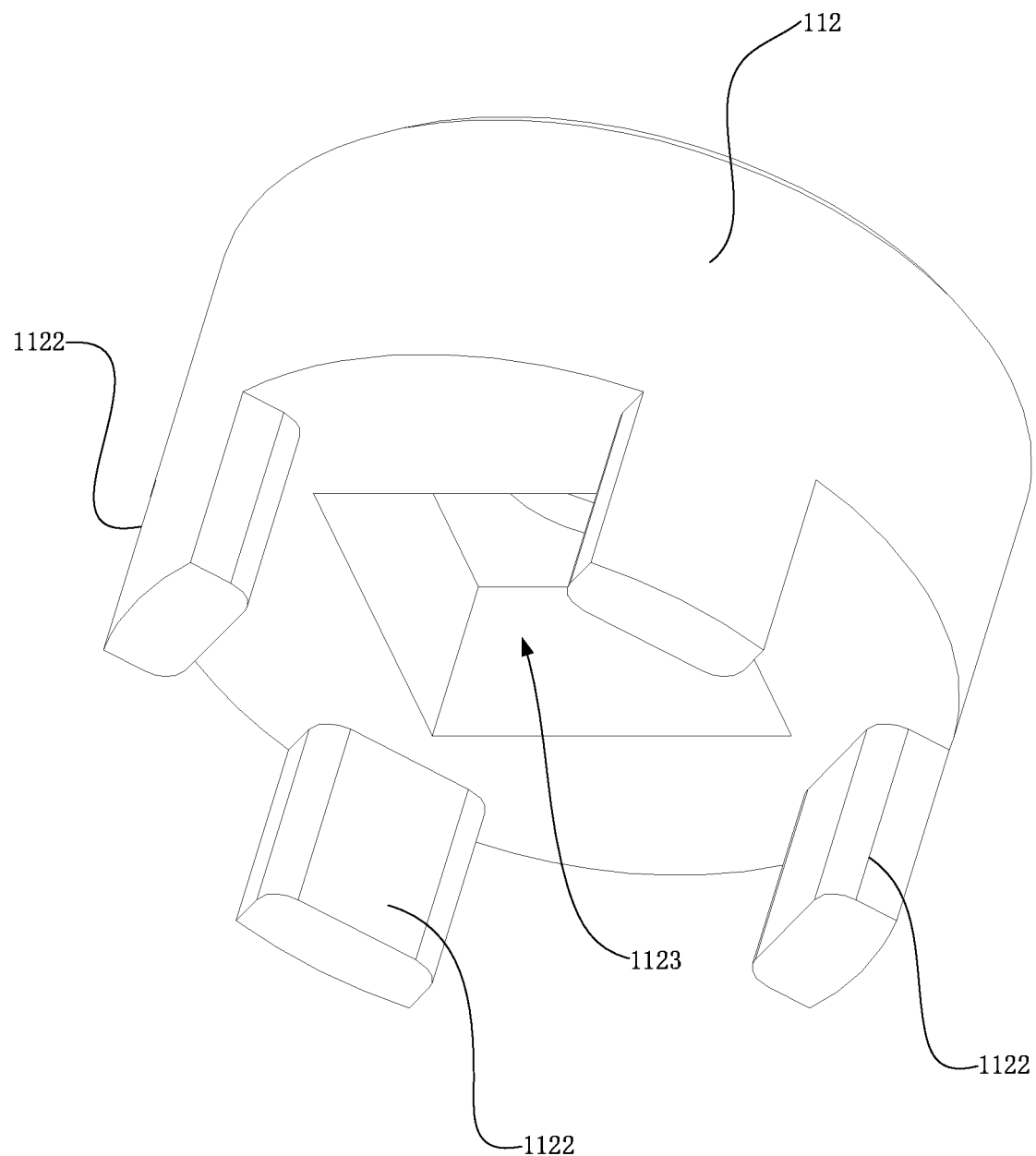
FIG. 5 is a perspective schematic diagram illustrating a connecting structure of a cover member in a heating device according to the invention.
Figure 6:
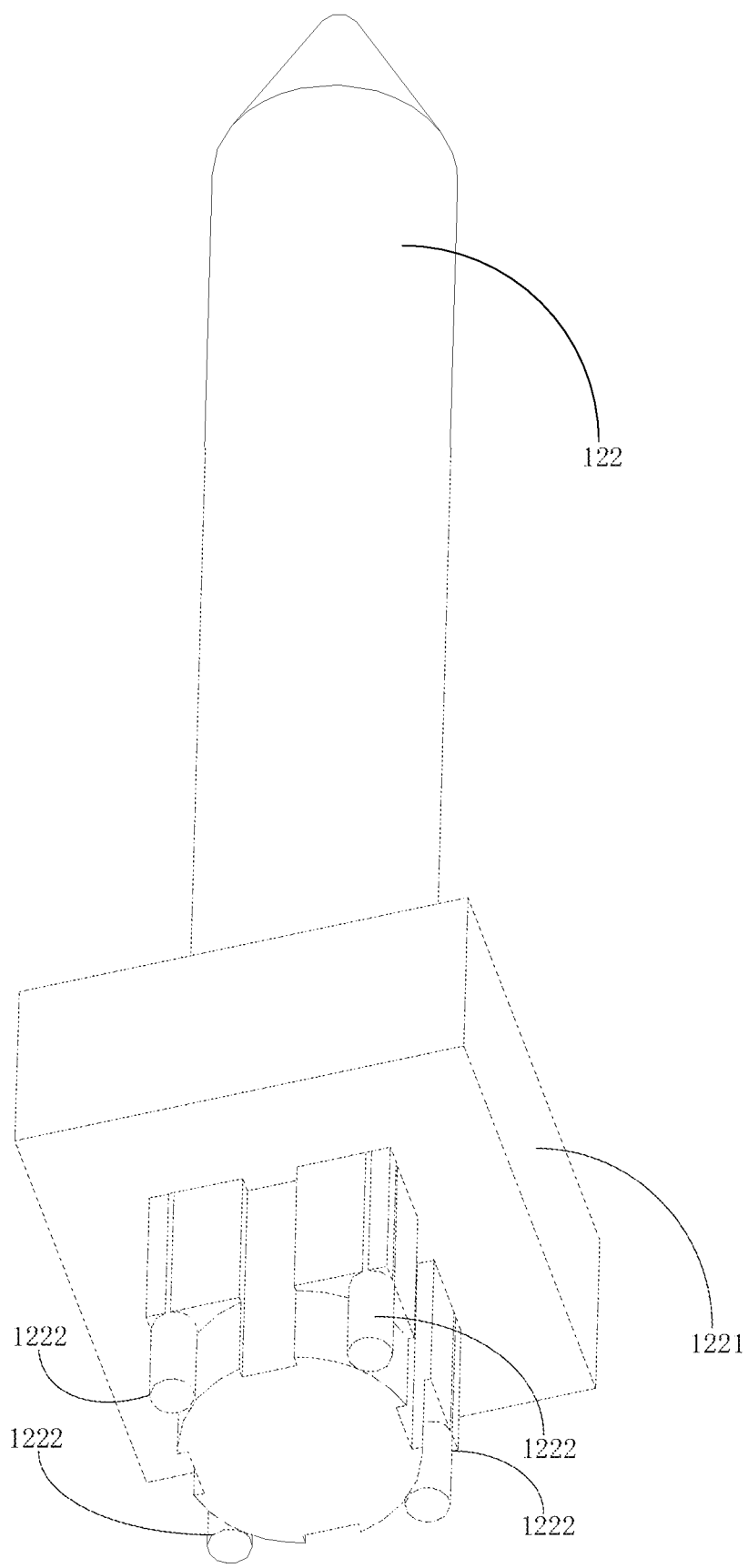
FIG. 6 is a perspective schematic diagram illustrating a connecting structure of a heat generating unit in a heating device according to the invention.

Further, as shown in FIG. 5 and FIG. 6, in the embodiment of the invention, one of the heat generating unit 122 and the cover member 112 is provided with a positioning part 1221, and the other thereof is correspondingly provided with a positioning groove 1123, and when the cover member 112 is mounted in the installing groove 1111, the positioning part 1221 is received in the positioning groove 1123, so that the heat generating unit 122 is limited to the cover member 112. Here, the heat generating unit 122 is a cylindrical heat generating rod. The bottom end of the heat generating rod is convexly provided with a positioning part 1221. The cover member 112 is correspondingly provided with a positioning groove 1123. The bottom groove wall of the positioning groove 1123 is provided with a through hole through which the heat generating unit 122 passes. When the cover member 112 is mounted on the installing groove 1111, the heat generating unit 122 is partially received in the receiving space 31 through the through hole. The positioning part 1221 is received in the positioning groove 1123 to effectively prevent the phenomenon that the heat generating rod rotates during use.

Specifically, as shown in FIG. 2 or FIG. 3, in the embodiment of the invention, the heating base 10 is further provided with a conductive terminal 123 electrically connected to the circuit board 121 and an opening 1112 exposed to the conductive terminal 123, the conductive terminal 123 comprises a positive electrode contact 1231 and a negative electrode contact 1232, and when the heating device 100 is mounted in the installing chamber 210, the positive electrode contact 1231 is electrically connected to an output positive electrode of the battery component 200, and the negative electrode contact 1232 is electrically connected to an output negative electrode of the battery component 200. Here, in the present embodiment, the heating base 10 and the battery component 200 are connected by threads. The negative electrode contact 1232 of the conductive terminal 123 is annular. The positive electrode contact 1231 is provided in the middle of the annular shape encircled by the negative electrode contact 1232. Each of the output negative electrode and the output positive electrode adopts a conductive elastic pin. The battery component 200 is correspondingly provided with a positive electrode conductive elastic pin and a negative electrode conductive elastic pin. The conductive elastic pin of the output positive electrode is provided corresponding to the positive electrode contact 1231, and the conductive elastic pin of the output negative electrode is provided on the trajectory of the annular negative electrode contact 1232 so that when the heating base 10 is rotatably mounted, the negative electrode contact 1232 and the positive electrode contact 1231 always correspond to the output negative electrode and the output positive electrode, effectively preventing the phenomenon that the electrode contact misalignment results in an obstructed circuit. At the same time, the battery component 200 adopts a conductive elastic pin to form an elastic contact between the conductive terminal 123 and the output electrode of the battery component 200, effectively causing the conductive terminal 123 to closely abut against the elastic ejector pin of the battery component 200, and enhancing the stability of current conduction.

It is to be understood that, in another embodiment of the invention, the manner in which if the heating base 10 and the battery component 200 are connected in a snap-fit manner, the conductive terminal 123 comprises a positive electrode contact 1231 and two negative electrode contacts 1232 which are spaced apart symmetrically with respect to the positive electrode contact 1231 to effectively prevent the user from reversely connecting the electrode contact of the heating base 10 and the output electrode of the battery component 200 also falls within the scope of protection of the invention.

Specifically, as shown in FIG. 2 or FIG. 3, in the embodiment of the invention, the conductive terminal 123 further comprises a substrate 1233. The positive electrode contact 1231 and the negative electrode contact 1232 are mounted on the substrate 1233. One end of the heat generating unit 122 abuts against the substrate 1233 through the circuit board 121, and the other end thereof is received in the receiving space 31 through the cover member 112. Here, in the present embodiment, the conductive terminal 123 further comprises a substrate 1233. The circuit board 121 is provided with a plurality of conductive pads 1214 for electrically connecting the substrate 1233 and the circuit board 121. The positive electrode contact 1231 and the negative electrode contact 1232 are mounted on the substrate 1233. Moreover, one end of the heat generating unit 122 abuts against the substrate 1233 through the circuit board 121, and provides a certain supporting force for the substrate 1233, effectively preventing the phenomenon that the elastic ejector pin damages the substrate 1233 due to the excessive force when the heating base 10 is rotatably mounted. At the same time, the substrate 1233 of the conductive terminal 123 and the circuit board 121 are separately provided, effectively preventing the phenomenon that the positive electrode contact 1231 and the negative electrode contact 1232 are damaged during long-term use, resulting in the need to replace the entire circuit board 121, and further reducing the use cost.

Referring to FIG. 1, the invention further provides an electronic cigarette 1000. The electronic cigarette 1000 comprises a battery component 200 and a heating device 100. Refer to the above embodiment for the specific structure of the heating device 100. Due to the use of all the technical solutions of all the above embodiments, the electronic cigarette 1000 has at least all the beneficial effects brought by the technical solutions of the above embodiments, which will not be described in detail herein.

The above are preferred embodiments of the invention merely and are not intended to limit the patent scope of the invention. Any equivalent structures made according to the description and the accompanying drawings of the invention without departing from the idea of the invention, or any equivalent structures applied in other relevant technical fields directly or indirectly are intended to be included in the patent protection scope of the invention.

What is claimed is:

1. A heating device for an electronic cigarette, wherein the electronic cigarette comprises a battery component, the battery component is provided with a installing chamber having an opening, wherein the heating device comprises a heating base and a hollow sleeve, the sleeve is detachably mounted on the heating base, and is configured for forming a receiving space for receiving tobacco product together with the heating base, when the heating device is installed in the installing chamber, the heating base is electrically connected to the battery component, and the battery component is configured for driving the heating base to heat the tobacco product received in the receiving space;

wherein the heating base comprises a base body and a heat generating component, the base body is provided with an internal cavity and a installing groove, the internal cavity is communicated with the installing groove, one end of the heat generating component is received in the internal cavity, and the other end thereof is exposed to the outside of the installing groove through the internal cavity and the installing groove, and when the sleeve is mounted in the installing groove, a part of the heat generating component exposed to the outside of the installing groove is received in the receiving space;

wherein the base body comprises a carrying member and a cover member, the carrying member is provided with the installing groove, one end of the sleeve is provided with an installing part, and when the installing part is mounted in the installing groove, the cover member is pressed closely in the installing groove, so that the cover member covers a part of the groove wall of the installing groove, the cover member and the groove wall encircle the internal cavity.

2. The heating device according to claim 1, wherein one of the heating base and the sleeve is provided with a installing groove, and the other thereof is provided with an installing part, and when the sleeve is mounted on the heating base, the installing part is received in the installing groove so that the sleeve is fixed to the heating base.

3. The heating device according to claim 2, wherein an inner groove wall of the installing groove is provided with an internal thread, and an outer wall of the installing part is correspondingly provided with a connecting thread, so that the sleeve is detachably connected to the heating base; or, one of the inner groove wall of the installing groove and the outer surface of the installing part is convexly provided with a protrusion, and the other thereof is correspondingly provided with an engaging slot, so that the sleeve is detachably connected to the heating base; or, both the inner groove wall of the installing groove and the outer surface of the installing part are each correspondingly provided with a through hole, the heating base further comprises a connecting pin, and the connecting pin is inserted into the two through holes, so that the sleeve is detachably connected to the heating base; or, one of the installing groove and the installing part is provided with an elastic clamping part, and when the installing part is mounted in the installing groove, the elastic clamping part clamps the installing part in the installing groove, so that the sleeve is detachably connected to the heating base.

4. The heating device according to claim 2, wherein the heating base is further provided with a first connecting part, the battery component is provided with a second connecting part inside the installing chamber, the first connecting part cooperates with the second connecting part, so that the heating base is detachably mounted in the installing chamber, one end of the sleeve far away from the heating base is further provided with a gripping part, and the gripping part protrudes from the installing chamber to the outside.

5. The heating device according to claim 1, wherein the heat generating component comprises a circuit board and a heat generating unit, the circuit board is mounted in the internal cavity, one end of the heat generating unit is mounted in the internal cavity and is electrically connected to the circuit board, and the other end thereof is received in the receiving space through the cover member, and when the heating device is mounted in the installing chamber, the circuit board is electrically connected to the battery component.

6. The heating device according to claim 5, wherein one of the circuit board and the cover member is provided with a limiting part, and the other thereof is correspondingly provided with a limiting groove, and when the cover member is mounted in the installing groove, one of the limiting parts is inserted into one of the limiting grooves, so that the circuit board is limited to the cover member; and/or one of the heat generating unit and the cover member is provided with a positioning part, and the other thereof is correspondingly provided with a positioning groove, and when the cover member is mounted in the installing groove, the positioning part is received in the positioning groove, so that the heat generating unit is limited to the cover member.

7. The heating device according to claim 5, wherein the heating base is further provided with a conductive terminal electrically connected to the circuit board and an opening exposed to the conductive terminal, the conductive terminal comprises a positive electrode contact and a negative electrode contact, and when the heating device is mounted in the installing chamber, the positive electrode contact is electrically connected to an output positive electrode of the battery component, and the negative electrode contact is electrically connected to an output negative electrode of the battery component.

8. An electronic cigarette, wherein the electronic cigarette comprises a battery component and the heating device according to claim 1.

\* \* \* \* \*